US012666144B2

(12) United States Patent
Myojin

(10) Patent No.: US 12,666,144 B2
(45) Date of Patent: Jun. 23, 2026

(54) ELECTRONIC APPARATUS AND CONTROL METHOD

(71) Applicant: CANON KABUSHIKI KAISHA, Tokyo (JP)

(72) Inventor: Rie Myojin, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 97 days.

(21) Appl. No.: 18/628,300

(22) Filed: Apr. 5, 2024

(65) Prior Publication Data

US 2024/0251162 A1 Jul. 25, 2024

Related U.S. Application Data

(63) Continuation of application No. PCT/JP2022/028833, filed on Jul. 26, 2022.

(30) Foreign Application Priority Data

Oct. 12, 2021 (JP) ................................. 2021-167309

(51) Int. Cl.
*H04N 23/667* (2023.01)
*H04N 23/60* (2023.01)

(52) U.S. Cl.
CPC ........... *H04N 23/667* (2023.01); *H04N 23/64* (2023.01)

(58) Field of Classification Search
CPC ...... H04N 23/667; H04N 23/64; H04N 23/71; H04N 23/45; H04N 23/60
See application file for complete search history.

(56) References Cited

U.S. PATENT DOCUMENTS

2018/0241928 A1* 8/2018 Chen ...................... H04N 23/63

FOREIGN PATENT DOCUMENTS

| CN | 111050078 | A | 4/2020 |
| JP | 2006251683 | A | 9/2006 |
| JP | 2009017457 | A | 1/2009 |

(Continued)

OTHER PUBLICATIONS

JP2014127151 (Information processing device, system and method) Akio Oba (Year: 2014).*

(Continued)

*Primary Examiner* — Yogesh K Aggarwal
(74) *Attorney, Agent, or Firm* — Cowan, Liebowitz & Latman, P.C.

(57) ABSTRACT

An electronic apparatus includes: a plurality of imaging devices including a first imaging device acquiring a first image, and a second imaging device acquiring a second image; and at least one processor capable of causing the electronic apparatus to: acquire a shooting parameter of at least one of the plurality of imaging devices; and perform control, in a case where a shooting parameter of the first imaging device is changed to a first shooting parameter by a user, such as to switch determinations whether or not to change a shooting parameter of the second imaging device based on the first shooting parameter, depending on whether or not a first relationship satisfies a predetermined condition, the first relationship being either a positional relationship between the first imaging device and the second imaging device, or a relationship between the first image and the second image.

13 Claims, 5 Drawing Sheets

(56)                References Cited

FOREIGN PATENT DOCUMENTS

| | | | |
|---|---|---|---|
| JP | 2013093836 | A | 5/2013 |
| JP | 2014127151 | A | 7/2014 |
| JP | 2016178435 | A | 10/2016 |
| JP | 2018182601 | A | 11/2018 |
| JP | 2018-207430 | A | 12/2018 |

OTHER PUBLICATIONS

JP2016178435 (Imaging controller, method and program) Arai hidesato (Year: 2016).*

The above U.S. Patent Publication and Foreign Patent Documents were cited in the Aug. 5, 2025 Japanese Office Action, which is enclosed with a machine generated English Translation, that issued in Japanese Patent Application No. 2021-167309.

* cited by examiner 112b 115                    100

ELECTRONIC APPARATUS AND CONTROL METHOD

CROSS-REFERENCE TO RELATED APPLICATIONS

This application is a Continuation of International Patent Application No. PCT/JP 2022/028833, filed Jul. 26, 2022, which claims the benefit of Japanese Patent Application No. 2021-167309, filed Oct. 12, 2021, both of which are hereby incorporated by reference herein in their entirety.

BACKGROUND OF THE INVENTION

Field of the Invention

The present invention relates to an electronic apparatus and a control method.

Background Art

Some smartphones are equipped with a plurality of cameras. Users sometimes simultaneously view a plurality of images with different angles of view taken by the respective cameras at the same time. Often, a piece of work that is a single image or album is created using a plurality of images taken by simultaneous photographing. In many of these cases, a balance in lightness and color is required between the plurality of images.

PTL 1 discloses a technique for a photographing device having two cameras, in which, when a shooting parameter of one camera (specifically, the gain for each color) is changed, the shooting parameter of the other camera is changed.

According to PTL 1, the change in the shooting parameter of one camera is always linked to the change in the shooting parameter of the other camera. Depending on the situation, the acquired image may sometimes be different from the user's intentions. The user then needs to reset the shooting parameter of the other camera, because of which there were instances in which the user would find the setting for acquiring a desired image not easy, or feel frustrated about it, or miss a shot.

CITATION LIST

Patent Literature

PTL 1 Japanese Patent Application Publication No. 2009-17457

SUMMARY OF THE INVENTION

Accordingly, an object of the present invention is to provide a technique that enables easy acquisition of an image with user's desired settings when plural imaging devices (units) simultaneously perform imaging.

To achieve the above object, an electronic apparatus according to the present invention includes: a plurality of imaging devices including a first imaging device acquiring a first image, and a second imaging device acquiring a second image; and at least one processor capable of causing the electronic apparatus to: acquire a shooting parameter of at least one of the plurality of imaging devices; and perform control, in a case where a shooting parameter of the first imaging device is changed to a first shooting parameter by a user, such as to switch determinations whether or not to change a shooting parameter of the second imaging device based on the first shooting parameter, depending on whether or not a first relationship satisfies a predetermined condition, the first relationship being either a positional relationship between the first imaging device and the second imaging device, or a relationship between the first image and the second image.

Further features of the present invention will become apparent from the following description of exemplary embodiments with reference to the attached drawings.

BRIEF DESCRIPTION OF THE DRAWINGS

FIG. 1A to FIG. 1C are external views of a smartphone according to one embodiment.

DESCRIPTION OF THE EMBODIMENTS

Embodiments of the present invention will be hereinafter described with reference to the drawings.

Embodiment

Figures 1A, 1C:
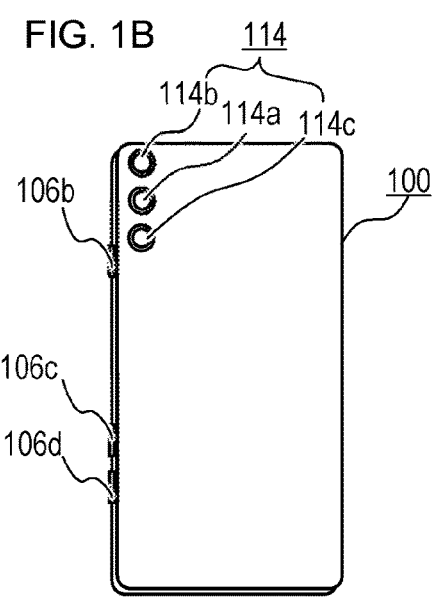

FIG. 1A to FIG. 1C are external views of a smartphone 100, which is one example of the device (electronic apparatus) according to the embodiment.

FIG. 1A is a front view of the smartphone 100, and FIG. 1B is a rear view of the smartphone 100. FIG. 1C is a front view of a smartphone 100 with two front cameras.

Display 105 is a display unit provided on the front side of the smartphone 100. The display 105 shows images and various pieces of information on the display surface. The display 105 can show live view images (LV images) of an object captured by a rear camera unit 114 or a front camera unit 115 (front cameras 115a and 115b). The rear camera unit 114 includes a telephoto rear camera 114a, a standard rear camera 114b, and a wide-angle rear camera 114c. Live view images (LV images) are images that are being captured and acquired by a camera in real time.

Operation unit 106 includes a touch panel 106a, a power button 106b, a sound up button 106c, a sound down button 106d, and a home button 106e.

The touch panel 106a is a touch operation member. The touch panel 106a detects touch gestures on the display surface (operation surface) of the display 105.

The power button 106b is a button for turning on and off the display 105 (switching between display and non-display). Pressing down the power button 106b continuously (long pressing) for a certain period of time (e.g. 3 seconds) allows the user to toggle between power ON/OFF of the smartphone 100.

The sound up button 106c and sound down button 106d are sound volume buttons for controlling the sound volume of the audio output from an audio output unit 112. Pressing down the sound up button 106c allows the user to increase the sound volume of the audio output from the audio output unit 112. Pressing down the sound down button 106d allows the user to decrease the sound volume of the audio output from the audio output unit 112.

In the state ready for shooting after a camera application for taking pictures is started up, the sound up button 106c and sound down button 106d can also be used as a shutter button to instruct shooting every time they are pressed down. The user can set, as desired, such that pressing down the power button 106b and the sound down button 106d at the same time, or pressing down the sound down button 106d quickly several times, causes the smartphone 100 to execute a specified process.

The home button 106e is an operation button for displaying a home screen that is the start-up screen of the smartphone 100 on the display 105. When any application is open (being used) in the smartphone 100, pressing down the home button 106e causes the open application(s) to close temporarily, after which the home screen is displayed. While the home button 106e is supposed to be a physical button (a button that can be physically pressed down) here, it may also be a graphical user interface (GUI) button shown on the display 105.

Audio output terminal 112a is a terminal for outputting audio to an earphone or external speaker. The audio output terminal 112a is, for example, an earphone jack. The speaker 112b is a built-in speaker that outputs audio. Without a predetermined terminal (e.g., earphone cord) attached to the audio output terminal 112a, the audio output from the audio output unit 112 is output from the speaker 112b.

Figure 2:
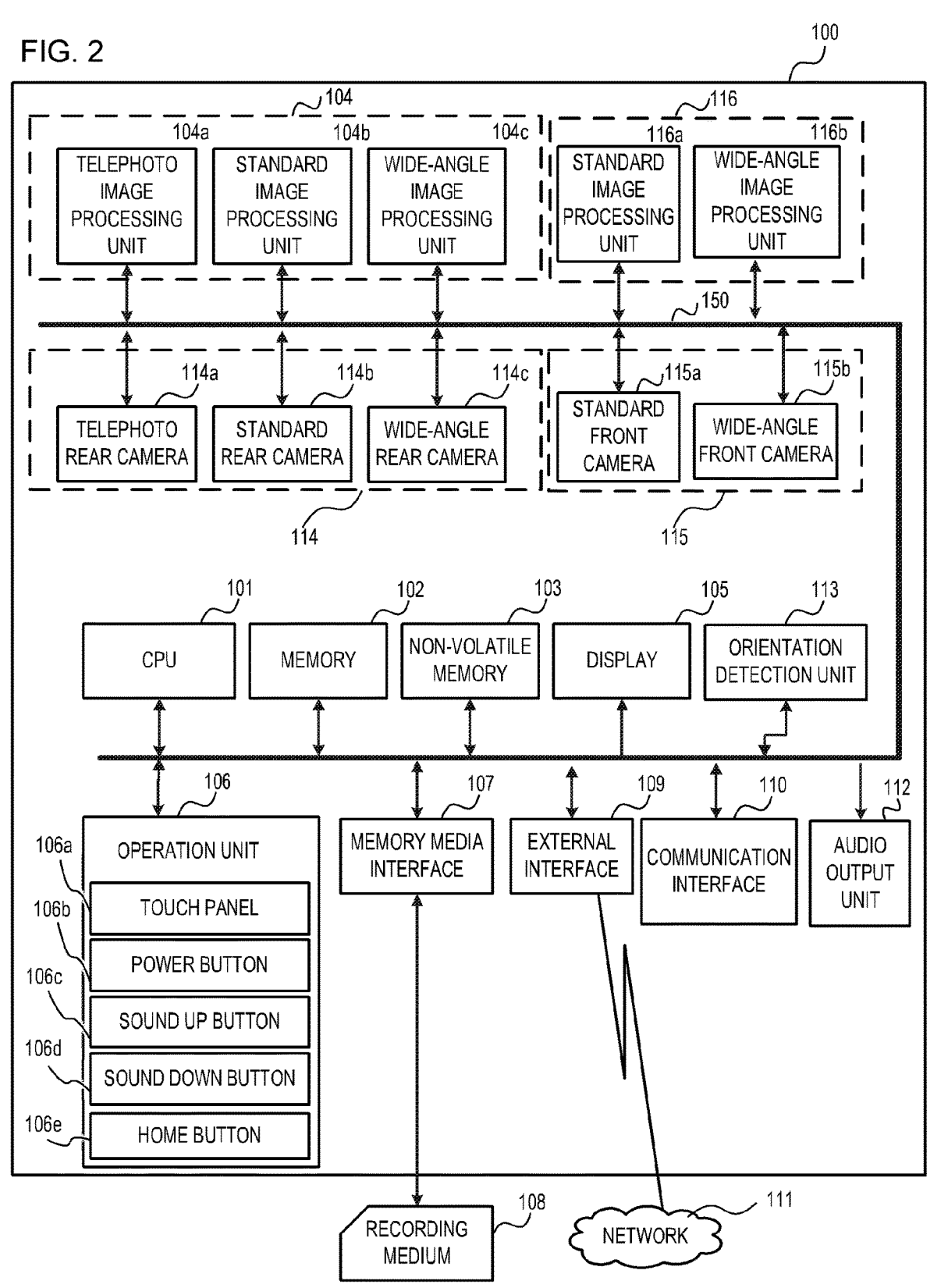
FIG. 2 is an internal configuration diagram of the smartphone according to the embodiment.

FIG. 2 is a configuration diagram illustrating an example of the internal configuration of the smartphone 100 shown in FIG. 1B and FIG. 1C. The smartphone 100 includes a CPU 101, a memory 102, a non-volatile memory 103, a processing unit 104, display 105, operation unit 106, a memory media interface 107, external interface 109, and a communication interface 110. The smartphone 100 also includes the audio output unit 112, an orientation detection unit 113, the rear camera unit 114, front camera unit 115, and processing unit 116. These components are connected to an internal bus 150 and are able to exchange data with each other via the internal bus 150.

The CPU 101 is a control unit that controls the entire smartphone 100. The CPU 101 includes at least one processor or circuit. The CPU 101 controls the various components of the smartphone 100 in accordance with a program stored in the non-volatile memory 103, for example, using the memory 102 as a work memory.

The memory 102 includes a RAM (volatile memory that uses a semiconductor device), for example. The non-volatile memory 103 stores image data, audio data, other data, and various programs run by the CPU 101. The non-volatile memory 103 includes a flash memory or ROM, for example.

The processing unit 104 performs various types of image processing and object recognition processing to the images acquired by the rear camera unit 114. The various types of image processing include, for example, A/D conversion, D/A conversion, image data encoding, compression, decoding, enlargement/reduction (resizing), noise reduction, color conversion, and so on.

The processing unit 104 includes a telephoto image processing unit 104a, a standard image processing unit 104b, and a wide-angle image processing unit 104c. The telephoto image processing unit 104a performs various types of image processing and object recognition processing to the images acquired by the telephoto rear camera 114a. The standard image processing unit 104b performs various types of image processing and object recognition processing to the images acquired by the standard rear camera 114b. The wide-angle image processing unit 104c performs various types of image processing and object recognition processing to the images acquired by the wide-angle rear camera 114c.

The processing unit 116 performs various types of image processing and object recognition processing to the images acquired by the front camera unit 115. A standard image processing unit 116a performs various types of image processing and object recognition processing to the images acquired by the standard front camera 115a. A wide-angle image processing unit 116b performs various types of image processing and object recognition processing to the images acquired by the wide-angle front camera 115b. In this embodiment, the telephoto rear camera 114a, standard rear camera 114b, and wide-angle rear camera 114c are each an individual lens unit. That is, the rear camera unit 114 is composed of three lens units. Likewise, the standard front camera 115a and wide-angle front camera 115b are each an individual lens unit, i.e., the front camera unit 115 is composed of two lens units. Namely, the smartphone 100 shown in FIG. 2 includes five lens units.

In the following, the telephoto rear camera 114a, standard rear camera 114b, wide-angle rear camera 114c, standard front camera 115a, and wide-angle front camera 115b will be collectively referred to simply as "cameras" when they need not be distinguished from each other. Likewise, the telephoto image processing unit 104a, standard image processing unit 104b, wide-angle image processing unit 104c, standard image processing unit 116a, and wide-angle image processing unit 116b will be collectively referred to simply as "image processing units" when they need not be distinguished from each other.

While one image processing unit corresponds to one camera (imaging unit) in this embodiment, one image processing unit may correspond to two cameras, or one image processing unit may correspond to three cameras. Namely, one image processing unit may perform various types of image processing and object recognition processing to the images acquired by a plurality of cameras.

The cameras each capture images of an object in accordance with respectively set shooting parameters. The shooting parameters include parameters relating to lightness (shutter speed, aperture, strobe light condition, ISO sensitivity, or brightness), and parameters relating to color (white balance (WB), color temperature). The CPU 101 can acquire, from each camera, the shooting parameters set for each camera.

Each image processing unit can perform various types of image processing also to various other images (e.g., images stored in the non-volatile memory 103 or memory medium 108, images acquired via the external interface 109, or images acquired via the communication interface 110). Each image processing unit may be configured as a dedicated circuit block for performing a specific type of image processing. Depending on the type of image processing, the CPU 101 can also perform image processing in accordance with a program, without using any of the image processing units.

The display 105 shows images or GUI screens configured with GUI (Graphical User Interface). The CPU 101 causes various components to generate images (image signals) based on display control signals in accordance with a program. The display 105 shows the images generated by the various components. The smartphone 100 may be configured to have only the interface in itself for outputting images, and an external monitor (such as a TV) may be used instead of the display 105 to display the images. That is to say, the smartphone 100 may not necessarily include the display 105.

The operation unit 106 is an input device (operation member) for receiving user operation. The operation unit 106 includes an alphanumeric input device (such as a keyboard), a pointing device (such as a mouse or touch panel), buttons, dials, joysticks, touch sensors, touchpads and so on. The touch panel is an input device configured in a planar form and laid over the display 105 to output coordinate information corresponding to the touched position. In this embodiment, as described above, the operation unit 106 includes the touch panel 106a, power button 106b, sound up button 106c, sound down button 106d, and home button 106e.

The memory media interface 107 allows a memory medium 108 such as a memory card, CD, and DVD to be mounted thereto. The memory media interface 107 reads out data from the memory medium 108, or writes data in the memory medium 108. The memory medium 108 may be a built-in storage included in the smartphone 100.

The external interface 109 is an interface connected to external equipment via a wire cable or wirelessly for input and output of images and audio. The communication interface 110 is an interface for sending and receiving various pieces of data such as files and commands through communication with external equipment or a network 111.

The audio output unit 112 outputs the audio of video or music, short tones, ringtones, and various notification sounds. The audio output unit 112 includes the audio output terminal 112a for connecting an earphone or the like, and the speaker 112b. The audio output unit 112 may output audio by wireless communication.

The orientation detection unit 113 detects the orientation of the smartphone 100 relative to the direction of gravity, (the inclination of orientation relative to the yaw, roll, and pitch axes). On the basis of the orientation detected by the orientation detection unit 113, the CPU 101 is able to determine the state of the smartphone 100 (whether the smartphone 100 is held horizontally or vertically, whether it is oriented upward or downward, or whether it is oriented diagonally). At least one of an acceleration sensor, gyro sensor, geomagnetic sensor, azimuth sensor, and altitude sensor, or a combination of a plurality of these sensors, can be used as the orientation detection unit 113.

The rear camera unit 114 includes three rear cameras (imaging units) disposed on the opposite side from the display 105 of the housing of the smartphone 100. As described above, the rear camera unit 114 includes three rear cameras: the telephoto rear camera 114a, standard rear camera 114b, and wide-angle rear camera 114c.

The telephoto rear camera 114a has a longer focal length than that of the standard rear camera 114b. Therefore, the telephoto rear camera 114a can capture more detailed telephoto images than the standard rear camera 114b. The wide-angle rear camera 114c has a shorter focal length than that of the standard rear camera 114b. Therefore, the wide-angle rear camera 114c can capture images in wider angles than the standard rear camera 114b. Namely, the focal length becomes shorter in the order of the telephoto rear camera 114a, standard rear camera 114b, and wide-angle rear camera 114c, and the angle of view becomes wider in this order. While the telephoto rear camera 114a in this embodiment is supposed to include a lens mechanism that optically magnifies images equally to the predetermined magnification, the telephoto rear camera may include a mechanism that allows the user to change the magnification. These three cameras, i.e., telephoto rear camera 114a, standard rear camera 114b, and wide-angle rear camera 114c, can capture an image at the same time.

In this embodiment, the image sensor is supposed to be disposed for each rear camera. That is, the rear camera unit 114 of the smartphone 100 includes the same number of image sensors (three in this embodiment) as the number of rear cameras included in the smartphone 100. Likewise, the front camera unit 115 includes the same number of image sensors (two in this embodiment) as the number of front cameras included in the smartphone 100. Note, however, the image sensors need not be disposed one each for each camera (lens unit). That is, the three rear cameras 114a to 114c may share and use one image sensor (namely, the rear camera unit 114 of the smartphone 100 may have one image sensor). While it has been mentioned that the three rear cameras are capable of simultaneously capturing an image (by a parallel or time-sharing method), this does not mean that all three of the rear cameras need to capture an image at the same time. Any two of the three rear cameras may capture an image, or one camera alone may capture an image.

The front camera unit 115 includes two front cameras (imaging units) disposed on the same side as the display 105 of the housing of the smartphone 100. The front camera unit 115 includes the standard front camera 115a and wide-angle front camera 115b.

It is possible to simultaneously drive one of the rear cameras 114a to 114c and one of the front cameras 115a and 115b to capture an image.

While it has been mentioned that a rear camera and a front camera may simultaneously capture an image, this does not mean that the two cameras need to capture an image at the same time. One of the rear camera and front camera alone may capture an image. Similarly to the rear camera unit 114, the two front cameras 115a and 115b may be driven at the same time to capture an image, or one of the front cameras alone may capture an image.

The smartphone 100 can display the LV images acquired through image capturing by the camera(s) on the display 105. Namely, when plural cameras are driven at the same time, the LV images acquired by these cameras capturing images are displayed at the same time on the display 105 side by side or stacked as shown in FIG. 3A to FIG. 3C and FIG. 4A to FIG. 4C.

Figures 3A, 3B, 3C:
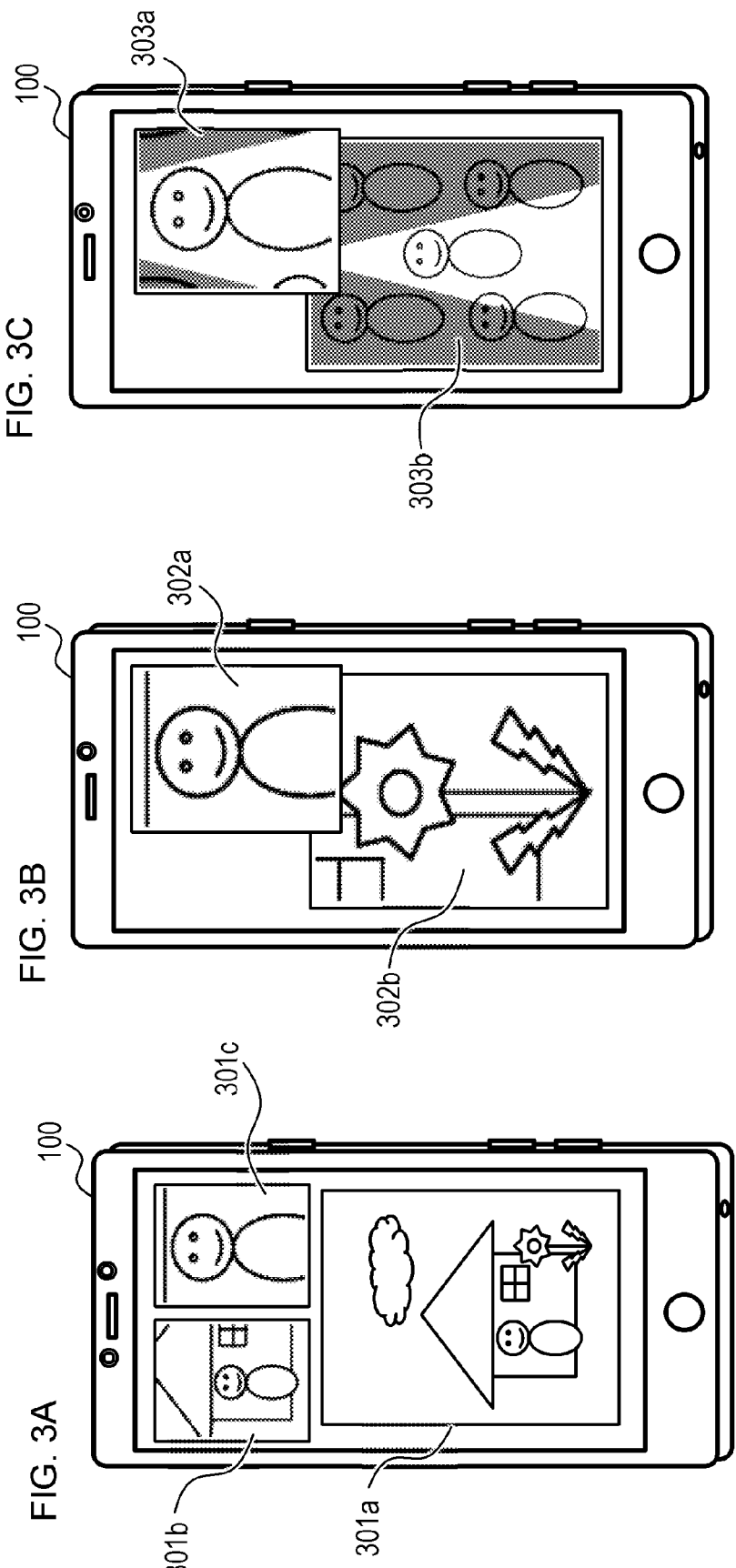
FIG. 3A to FIG. 3C are diagrams explaining the display of LV images according to the embodiment.

In FIG. 3A, the display 105 shows an LV image 301a acquired by the wide-angle rear camera 114c, an LV image 301b acquired by the standard rear camera 114b, and an image 301c acquired by the telephoto rear camera 114a. Namely, the image is being captured using all three of the installed rear cameras. From the compositions of the LV images in FIG. 3A, it is assumed that the three rear cameras are shooting the same object (person present in the LV views).

In FIG. 3B, the display 105 shows an LV image 302a acquired by the standard rear camera 114b, and an LV image 302b acquired by the telephoto rear camera 114a. The LV image 302a shows a first person captured by the standard rear camera 114b, and the LV image 302b shows a flower captured by the telephoto rear camera 114a. The LV image 302a shown in FIG. 3B is an electronic zoom of the LV image captured by the standard rear camera 114b. Therefore, the angle of view is smaller than that of the LV image 301b acquired by the standard rear camera 114b, shown in FIG. 3A (the size of the first person is increased). From FIG. 3B, it is assumed that the two rear cameras are used, and that the user is trying to shoot different objects rather than shooting the same object with the two rear cameras.

FIG. 3C shows an LV image 303a of a second person captured by the telephoto rear camera 114a, and an LV image 303b of several people including the second person captured by the wide-angle rear camera 114c. From FIG. 3C, it is assumed that the user wishes to include at least the same object (second person) in the LV images captured using the two rear cameras. For example, while shooting a stage play, the user may wish to shoot the whole stage, as well as a close-up of someone the user personally supports. In such a case, using the telephoto rear camera 114a and the wide-angle rear camera 114c, of the three rear cameras, for the shooting, allows the above-described shooting condition to be satisfied.

Figures 4A, 4B, 4C:
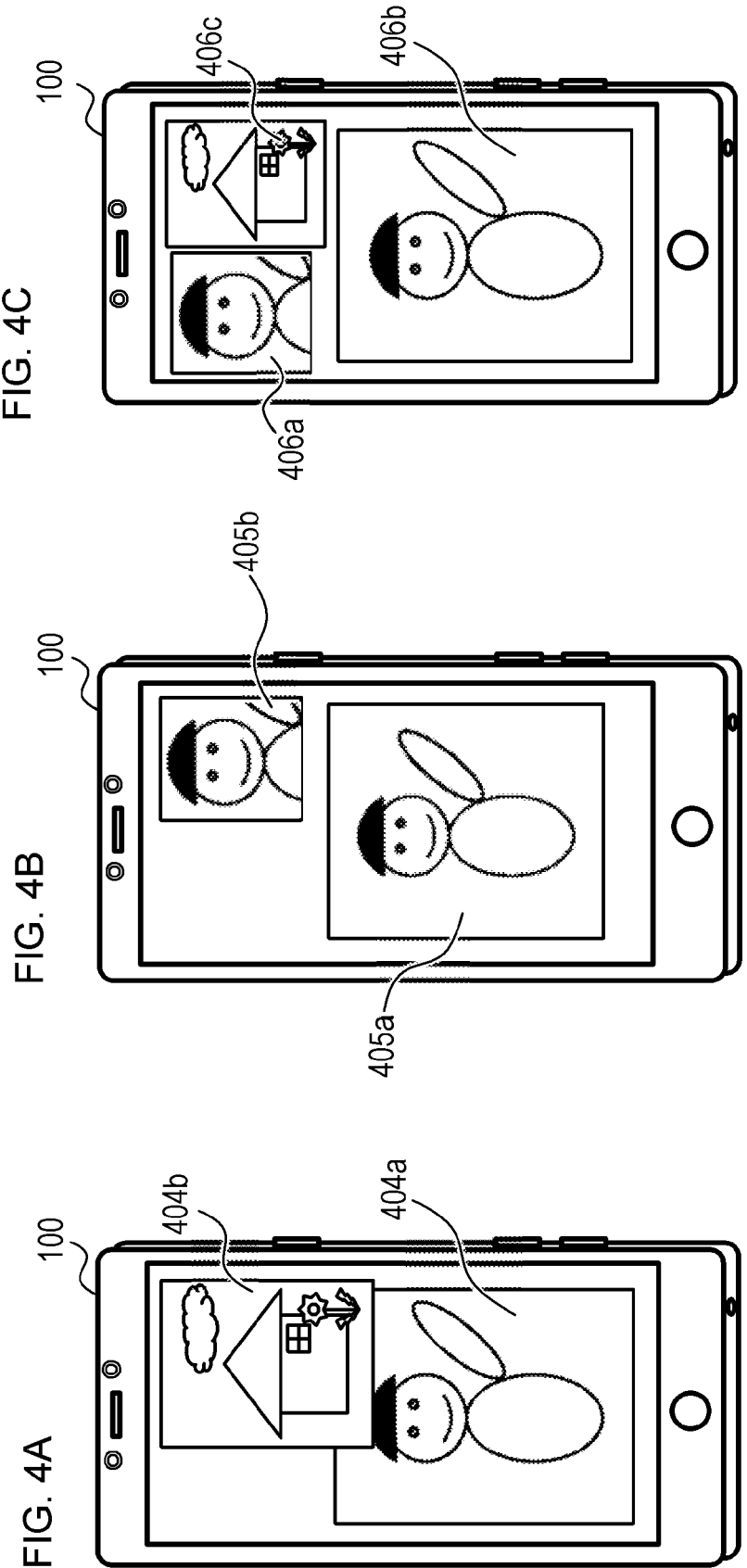
FIG. 4A to FIG. 4C are diagrams explaining the display of LV images according to the embodiment.

In FIG. 4A, the display 105 shows an LV image 404a of a third person captured by the wide-angle front camera 115b, and an LV image 404b of a house captured by the wide-angle rear camera 114c. The user using the front camera and the rear camera indicates that the user is trying to take a self-portrait of himself taking pictures with a front camera while shooting a landscape with a rear camera. That is, it indicates that the user is trying to capture images with an angle of view such that the shooting directions (the directions the camera faces to capture images) are opposite from each other.

In FIG. 4B, the display 105 shows an LV image 405a of the third person captured by the wide-angle front camera 115b, and an LV image 405b of the third person captured by the standard front camera 115a. FIG. 4B indicates that the shooting condition is similar to that described with reference to FIG. 3C, i.e., it is assumed that the user is trying to shoot the same object (here, the user himself) with different angles of view using the two front cameras. While the object captured in FIG. 4B is only one person, the following situation is possible. For example, while shooting a group of people using the front camera, the wide-angle camera 115b can be used for the framing that allows everyone to be included in the angle of view, and the standard front camera 115a can be used to shoot the user himself or a specific person alone in close-up. This allows the user to capture an image that includes a plurality of objects with a wide angle of view, while observing a desired person alone in more detail.

In FIG. 4C, the display 105 shows an LV image 406a of the third person captured by the standard front camera 115a, an LV image 406b of the third person captured by the wide-angle front camera 115b, and an LV image 406c of a house captured by the wide-angle rear camera 114c. FIG. 4C shows that the user can shoot a landscape using the rear camera while taking a self-portrait with the front camera. This is effective when the user wishes to capture his reaction when he saw a landscape in a travel destination, for example, while mainly shooting his own reactions.

While the LV images shown in this embodiment are rectangular and arranged side by side or stacked, the LV images may each be shown in any other shapes such as circular. Moreover, while two or three LV images are shown in the example, the LV images may be displayed in a larger number. All the LV images may have the same size, or different sizes. For example, LV images that were acquired with a shorter focal length of the camera may be shown in a larger size.

The CPU 101 is able to detect the following operations made to the touch panel 106a or the states of the touch panel.

A finger or pen that was not touching the touch panel 106a newly touching the touch panel 106a, i.e., the start of a touch (hereinafter referred to as "Touch-Down")

A finger or pen touching the touch panel 106a (hereinafter referred to as "Touch-On")

A finger or pen touching and moving on the touch panel 106a (hereinafter referred to as "Touch-Move")

A finger or pen that was touching the touch panel 106a being released from the touch panel 106a, i.e., the end of a touch (hereinafter referred to as "Touch-Up")

Nothing touching the touch panel 106a (hereinafter referred to as "Touch-Off")

Touch-On is detected upon detection of Touch-Down. Normally, Touch-On is continuously detected after Touch-Down unless Touch-Up is detected. Touch-On is also detected simultaneously with the detection of Touch-Move. Touch-Move is not detected even though Touch-On is being detected unless the touched position is moving. Touch-Off is detected upon detection of Touch-Up of all the fingers or pen that were touching.

These operations or states, and the coordinates of the position where a finger or pen is touching on the touch panel 106a are sent to the CPU 101 via the internal bus. The CPU 101 determines what operation (touch gesture) was performed on the touch panel 106a based on the sent information.

In the case with Touch-Move, the moving direction of the finger or pen on the touch panel 106a can be determined from the changes in the vertical and horizontal components in position coordinates on the touch panel 106a. A Touch-Move detected over a predetermined distance or more is determined as a sliding gesture.

Moving a finger in contact with the touch panel 106a only some distance and then releasing it is called a flick. A flick in other words is a quick flicking motion on the touch panel 106a. A Touch-Move detected over a predetermined distance or more at a predetermined speed or more followed by a Touch-Up can be determined as a flick gesture (determined as a flick following a sliding gesture).

A touch gesture in which plural (e.g., two) points are touched at the same time and moved together is called pinch-in, and a touch gesture in which the touch points are moved apart is called pinch-out. Pinch-in and pinch-out are collectively called pinch operation (or simply Pinch). The touch panel 106a may be any of various types of touch panels such as resistive touch panels, capacitive touch panels, surface acoustic wave touch panels, infrared touch panels, electromagnetic induction touch panels, image recognition touch panels, optical imaging touch panels, and so on. Some types of touch panels detect contact with the touch panel as a touch while others detect proximity of a finger or pen to the touch panel as a touch. Either type may be used. (Shooting Parameter Control Process)

Figure 5:
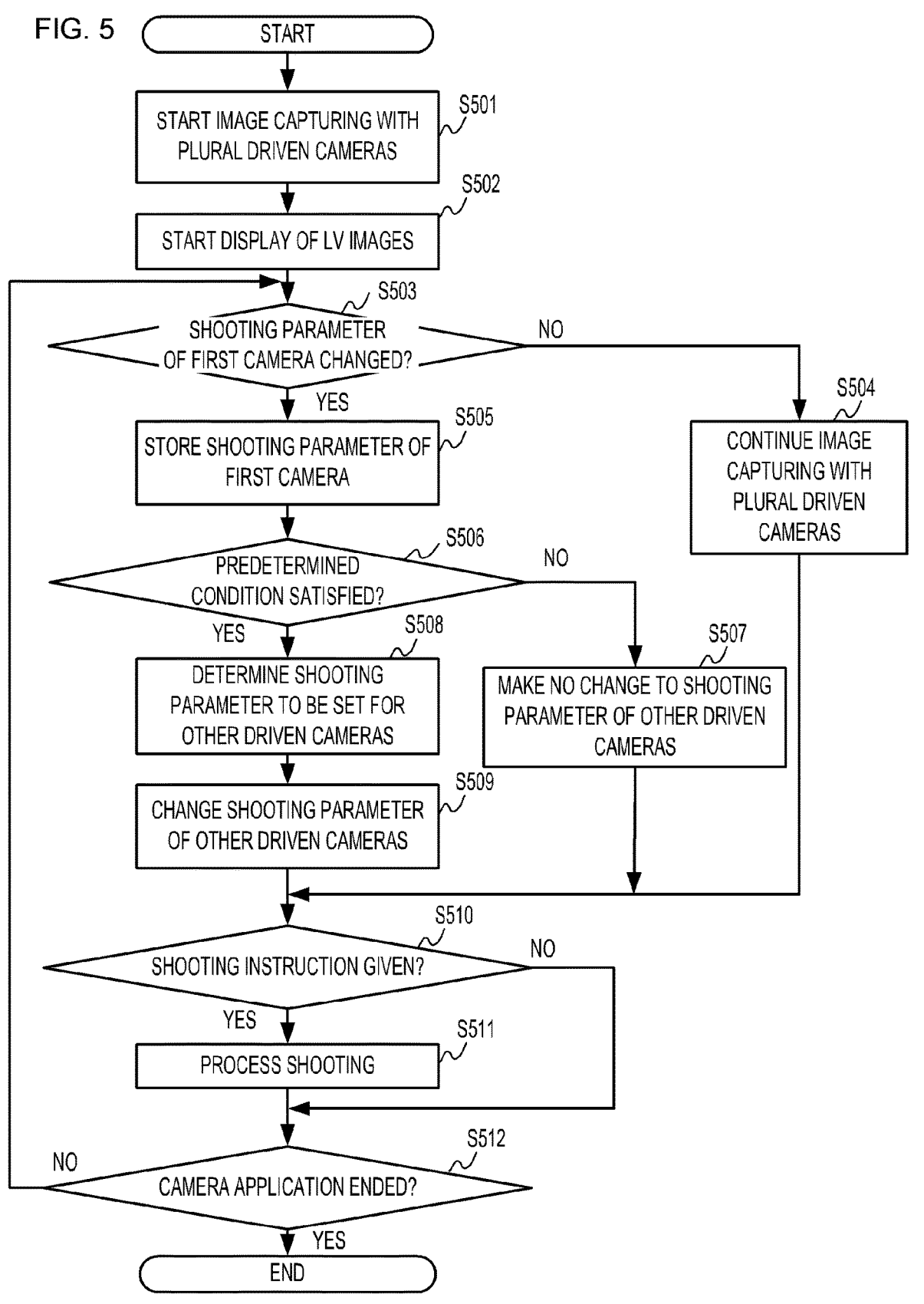
FIG. 5 is a flowchart illustrating an example of a shooting parameter control process according to the embodiment.

The following describes the control of shooting parameters of the cameras with reference to the flowchart of FIG. 5, i.e., how, during a period when plural cameras are capturing an image at the same time, when a shooting parameter of one camera is changed, the shooting parameter of the other camera(s) is controlled (shooting parameter control process). The shooting parameters refer to parameters set for the camera when capturing images. Specifically, the shooting parameters can include parameters relating to lightness (exposure value, shutter speed, F-number (aperture), strobe light condition, ISO sensitivity, or brightness). The shooting parameters can include parameters relating to color (white balance (WB), color temperature, or values for processing called filtering that is image processing relating to the color hues of the captured image). The shooting parameters are not limited to these and may be any values (parameters) relating to shooting that the user can change.

The processing in the flowchart is realized by the CPU 101 deploying a program stored in the non-volatile memory 103 and executing it in the memory 102. The flowchart of FIG. 5 starts when a camera application for taking pictures is started up to make the smartphone 100 ready for shooting.

At S501, the CPU 101 drives a plurality of cameras to start image capturing. The CPU 101 also starts various types of image processing by the image processing units corresponding to the plurality of cameras being driven (hereinafter referred to as "plurality of driven cameras"). The plurality of driven cameras can be two or more cameras selected by the user from the five cameras in the rear camera unit 114 and front camera unit 115. For example, the plurality of driven cameras may be three cameras, the telephoto rear camera 114a, standard rear camera 114b, and wide-angle rear camera 114c. The plurality of driven cameras may be two cameras, the standard rear camera 114b, and the standard front camera 115a.

At S502, the CPU 101 displays a plurality of LV images acquired by the image capturing at S501 by the plurality of driven cameras simultaneously on the display 105. While all the five cameras may be driven at this time, the display 105 may show the LV images captured by at least two cameras, by automatically determining the scenes of the landscape the user is shooting. In this case, even though the five cameras are being driven, the LV images captured by the two cameras, standard rear camera 114b and standard front camera 115a, are displayed until an instruction is given by the user. The number of LV images shown on the display 105 is changed or the cameras are switched in accordance with the instruction by the user.

For example, the CPU 101 displays a plurality of LV images side by side and/or stacked on the display 105 as shown in FIG. 3A to FIG. 3C and FIG. 4A to FIG. 4C. The CPU 101 may display only the LV images acquired by any two of three cameras on the display 105 even when the three cameras are being driven.

At S503, the CPU 101 determines whether or not a shooting parameter of one of the plurality of driven cameras (hereinafter referred to as "first camera") has been changed by a user's operation. When a shooting parameter of the first camera has been changed, the process goes to S505, and when not, to S504.

For example, in a state in which a plurality of LV images are shown on the display 105 as in FIG. 3A to FIG. 3C, the user selects the LV image (e.g., LV image 301a in FIG. 3A) of one of the cameras (e.g., wide-angle rear camera 114c) by Touch-Down. When the user has changed a parameter relating to the LV image (e.g., color hue, lightness, exposure value, brightness, or ISO sensitivity) by Touch-Move or a flick, the CPU 101 determines that a shooting parameter of the camera corresponding to this image has been changed. In this case, the CPU 101 changes the shooting parameter corresponding to this LV image to acquire an LV image reflecting the change of the parameter as instructed by the Touch-Move or a flick. While the shooting parameter is changed by a touch gesture to the touch panel in this embodiment, the shooting parameter may be changed using an operation button or the like provided to the smartphone 100 that can be physically pressed down.

At S504, the CPU 101 continues the image capturing from S501 using the plurality of driven cameras, and displays the LV images acquired by the image capturing on the display 105. At S504, the CPU 101 does not change the shooting parameters of the plurality of driven cameras.

At S505, the CPU 101 stores the information of the changed shooting parameter of the first camera (e.g., wide-angle rear camera 114c) that was changed at S503 in the memory 102.

At S506, the CPU 101 determines whether or not a relationship between the plurality of driven cameras satisfies a predetermined condition. Here, the relationship between the plurality of driven cameras refers to one of a positional relationship between the plurality of driven cameras and a relationship between the plurality of images acquired by the image capturing by the plurality of driven cameras. When the relationship between the plurality of driven cameras satisfies the predetermined condition, the process goes to S508. When not, the process goes to S507. The case where the predetermined condition is satisfied is a case where the user wishes the shooting parameters of the plurality of driven cameras to be linked to each other.

For example, the predetermined condition is that the plural driven cameras are disposed on one surface (same surface) of the smartphone 100. Namely, when the plural driven cameras are both front cameras, or both rear cameras, the predetermined condition is satisfied. On the other hand, when the plural driven cameras include both a front camera and a rear camera, the predetermined condition is not satisfied. Accordingly, when only the two rear cameras alone are being driven at S501, the predetermined condition is satisfied.

The predetermined condition may be that all of the plural driven cameras are shooting a specific object (or the same object), or that a specific object is captured in all the LV images acquired by the plurality of cameras. In this case, the predetermined condition is satisfied when a specific object is captured in all of the LV images 301a to 301c as in FIG. 3A. On the other hand, the predetermined condition is not satisfied when the objects captured in the LV image 302a and LV image 302b are different as in FIG. 3B. A specific object is for example the main subject of the captured image, which can be a person, animal, or a predetermined building. The predetermined condition may also be that the same object is in focus in a plurality of cameras.

The predetermined condition may also be that a difference in brightness (mean value, median value, maximum value, minimum value, or most frequent value of brightness) between the plurality of LV images acquired by the plurality of driven cameras does not exceed a predetermined value. For example, the predetermined condition may be that the difference between the mean brightness of an LV image with the highest mean brightness and the mean brightness of an LV image with the lowest mean brightness does not exceed a predetermined value. Alternatively, the predetermined condition may be that all of the plural LV images acquired by the plurality of driven cameras include a specific object (or the same object), and that the difference in brightness between the plurality of LV images does not exceed a predetermined value. In this case, the predetermined condition is not satisfied when there is a large difference in brightness between the LV images even when, as in FIG. 3C, a specific object (same person) is captured in both of the LV image 303a and LV image 303b.

At S507, the CPU 101 does not change the shooting parameters of other driven cameras than the first camera of the plurality of driven cameras (hereinafter simply referred to as "other driven cameras"). Here, the CPU 101 does not "change the shooting parameters of other driven cameras based on the first shooting parameter". Therefore, when the user performs an operation for changing shooting parameters of other driven cameras, for example, the CPU 101 may change the parameters of the other driven cameras in accordance with this operation.

At S508, the CPU 101 first acquires the shooting parameter of the first camera that was stored in the memory 102 at S505. The CPU 101 then determines a shooting parameter to be newly set for other driven cameras based on the shooting parameter of the first camera (hereinafter referred to as "updated parameter"). For example, the CPU 101 may determine the shooting parameter of the first camera as it is as the value of the updated parameter. Alternatively, the CPU 101 may increase or decrease the current shooting parameter of the other driven cameras by the amount of change in the shooting parameter of the first camera that was changed at S503, and determine this value as the value of the updated parameter.

At S509, the CPU 101 changes (adjusts) the shooting parameters of the other driven cameras. Specifically, the CPU 101 changes the shooting parameters of the other driven cameras to the updated parameter determined at S508. At this time, the CPU 101 displays the LV images acquired by the other driven cameras after the change in the shooting parameters on the display 105.

The processing from S506 to S509 is performed collectively for all of the other driven cameras. Instead, the processing from S506 to S509 may be performed individually for each of the other driven cameras. Namely, at S506, the CPU may determine whether or not a predetermined condition is satisfied for each of the other drive cameras (LV images acquired by the other driven cameras), and switch determinations whether or not to change the shooting parameter of the corresponding camera in accordance with the determination result at S506. This allows for flexible adjustment of whether or not the shooting parameter is to be changed for each of the cameras, and facilitates acquisition of an image that better matches the user's intentions.

Let us now assume a case where, in the example of FIG. 4C, for example, the first camera capturing the LV image 406a is the standard front camera 115a and that the predetermined condition is that the first camera and other driven cameras are disposed on one surface of the smartphone 100. In this case, since the wide-angle front camera 115b capturing the LV image 406b is disposed on the same surface as the standard front camera 115a of the smartphone 100, the predetermined condition is satisfied at S506. Therefore, the CPU 101 changes the shooting parameter of the wide-angle front camera 115b at S508 and S509. On the other hand, the wide-angle rear camera 114c capturing the LV image 406c is not disposed on the same surface as the standard front camera 115a of the smartphone 100, and therefore the predetermined condition is not satisfied at S506. Therefore, the CPU 101 does not change the shooting parameter of the wide-angle rear camera 114c.

At S510, the CPU 101 determines whether or not a shooting instruction has been given. When a shooting instruction has been given, the process goes to S511, and when not, to S512. A shooting instruction is given for example by the user selecting (performing a touch gesture to) a predetermined icon (icon for the shooting) shown on the display 105. The shooting instruction may also be an instruction corresponding to an instance of pressing down a dedicated physical button. The shooting instruction may also be given on the basis of the pressing down of the sound up button 106c or sound down button 106d, the simultaneous pressing down of the power button 106b and sound down button 106d, or several instances of pressing down of the sound down button 106d within a short time.

At S511, the CPU 101 performs processing to be ready for shooting such as AF processing based on the display position of the AF (autofocus) frame, AE (auto exposure) processing, AWB (auto white balance) processing, and so on. After that, the CPU 101 performs the processing for shooting (series of processing for capturing images with the plurality of driven cameras and recording the images as image files in the recording medium 200).

At S512, the CPU 101 determines whether or not the camera application is ended. When the camera application is ended, the flowchart of FIG. 5 ends. When the camera application is not ended, the process returns to S503. The camera application is ended when, for example, the camera application is closed, or switched to another application (when another application is started up).

As described above, according to the embodiment, in the case where plural cameras capture images at the same time, when a shooting parameter of one camera is changed, the CPU 101 switches determinations whether or not to change the shooting parameter of the other cameras depending on whether or not a predetermined condition is satisfied. Specifically, when the predetermined condition is satisfied (when the user wishes the shooting parameters of a plurality of cameras to be linked to each other), the CPU 101 changes the shooting parameter of the other cameras as the shooting parameter of one camera is changed. When the user is taking pictures with a plurality of cameras, such control allows the user to acquire a plurality of LV images with their shooting parameter changed as desired by the user, only by making a change to a shooting parameter once. The user need not make the change himself to the respective shooting parameters of the LV images acquired by the plurality of cameras, which allows the user to carry on shooting without missing a shot. On the other hand, when the predetermined condition is not satisfied, the CPU 101 does not change the shooting parameter of the other cameras as the shooting parameter of one camera is changed. The fact that the predetermined condition is not satisfied indicates a high likeliness that, while the user has changed a shooting parameter of the LV image being captured by any one camera, the user does not want this change to be reflected to the parameter of the other cameras. This control therefore prevents user's unintended changes from being made (linked) to shooting parameters, which results in fewer instances of the user feeling frustrated. This allows the user to readily acquire a desired image even when plural cameras capture images simultaneously, and to carry on shooting without missing a shot.

The shooting parameters were described above as parameters set for the camera when the camera captures images, but the shooting parameters are not limited to such parameters. For example, the shooting parameters may be parameters applied to the images acquired by the cameras (i.e., parameters for editing the images acquired by imaging), such as white balance, color temperature, brightness, and so on. Namely, the CPU 101 may change the shooting parameter of the image captured by the second camera, when the shooting parameter of the image captured by the first camera is changed. In this case, too, the smartphone 100 allows the user to readily acquire a desired image as a result.

Various control processes described above that are performed by the CPU 101 may be carried out by one hardware system, or, separately by a plurality of hardware units (e.g., a plurality of processors or circuits) in a coordinated manner to achieve overall control of the device.

While the present invention has been described in detail based on the preferred embodiments, the present invention is not limited to these specific embodiments, and various other forms not departing from the scope of this invention are included in the present invention. The various embodiments described above merely illustrate one form of embodiment of the present invention and these embodiments can be combined as desired.

While one example in which the present invention is applied to a smartphone has been described in the embodiments above, the invention is not limited to this example and can be applied to any electronic apparatus capable of simultaneous image capturing with a plurality of imaging units (imaging devices). Namely, the present invention is applicable also to a personal computer, PDA, mobile phone terminal, mobile image viewer, printer device with a display, digital photo frame, music player, game machine, electronic book reader, and so on.

The present invention enables easy acquisition of an image with user's desired settings when plural imaging units simultaneously perform imaging.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An electronic apparatus comprising:
a plurality of imaging devices including a first imaging device configured to acquire a first image, and a second imaging device configured to acquire a second image; and
at least one processor capable of causing the electronic apparatus to:

acquire a shooting parameter of at least one of the plurality of imaging devices;
perform control to change a shooting parameter of the second imaging device to a second shooting parameter based on a first shooting parameter, perform control so that the first imaging device performs processing for shooting with the first shooting parameter, and perform control so that the second imaging device performs processing for shooting with the second shooting parameter in a case where a shooting parameter of the first imaging device is changed to the first shooting parameter by a user, and where a first relationship satisfies a predetermined condition, the first relationship being either a positional relationship between the first imaging device and the second imaging device, or a relationship between the first image and the second image; and
perform control not to change the shooting parameter of the second imaging device based on the first shooting parameter, perform control so that the first imaging device performs processing for shooting with the first shooting parameter, and perform control so that the second imaging device performs processing for shooting with the shooting parameter of the second imaging device, in a case where the shooting parameter of the first imaging device is changed to the first shooting parameter by a user, and where the first relationship does not satisfy the predetermined condition.

2. The electronic apparatus according to claim 1, wherein the shooting parameter is a parameter set for an imaging device, or a parameter applied to an image acquired by the imaging device.

3. The electronic apparatus according to claim 1, wherein the plurality of imaging devices includes a third imaging device acquiring a third image, and wherein the at least one processor is capable of causing the electronic apparatus to perform control, in a case where the shooting parameter of the first imaging device is changed to the first shooting parameter by the user, and where the first relationship satisfies the predetermined condition, such as not to change a shooting parameter of the third imaging device based on the first shooting parameter, if either a positional relationship between the first imaging device and the third imaging device, or a relationship between the first image and the third image, does not satisfy the predetermined condition.

4. The electronic apparatus according to claim 1, wherein the first relationship is the positional relationship between the first imaging device and the second imaging device, and wherein a case where a positional relationship between two imaging devices satisfies the predetermined condition is a case where the two imaging devices are provided on one surface of the electronic apparatus.

5. The electronic apparatus according to claim 1, wherein the first relationship is the relationship between the first image and the second image, and wherein a case where a relationship between two images satisfies the predetermined condition is a case where the two images both capture a specific object.

6. The electronic apparatus according to claim 1, wherein the first relationship is the relationship between the first image and the second image, and wherein a case where a relationship between two images satisfies the predetermined condition is a case where a difference in brightness between the two images does not exceed a predetermined value.

7. The electronic apparatus according to claim 1, wherein the first relationship is the relationship between the first image and the second image, and wherein a case where a relationship between two images satisfies the predetermined condition is a case where the two images both capture the specific object and a difference in brightness between the two images does not exceed a predetermined value.

8. The electronic apparatus according to claim 1, wherein the shooting parameter includes a parameter relating to lightness.

9. The electronic apparatus according to claim 8, wherein the shooting parameter includes at least one of shutter speed, aperture, strobe light condition, ISO sensitivity, and brightness.

10. The electronic apparatus according to claim 1, wherein the shooting parameter includes a parameter relating to color.

11. The electronic apparatus according to claim 10, wherein the shooting parameter includes at least one of white balance and color temperature.

12. A control method for an electronic apparatus comprising a plurality of imaging devices including a first imaging device acquiring a first image, and a second imaging device acquiring a second image, the control method comprising:

acquiring a shooting parameter of at least one of the plurality of imaging devices;

controlling to change a shooting parameter of the second imaging device to a second shooting parameter based on a first shooting parameter, controlling so that the first imaging device performs processing for shooting with the first shooting parameter, and controlling so that the second imaging device performs processing for shooting with the second shooting parameter in a case where a shooting parameter of the first imaging device is changed to the first shooting parameter by a user, and where a first relationship satisfies a predetermined condition, the first relationship being either a positional relationship between the first imaging device and the second imaging device, or a relationship between the first image and the second image;

controlling not to change the shooting parameter of the second imaging device based on the first shooting parameter, controlling so that the first imaging device performs processing for shooting with the first shooting parameter, and controlling so that the second imaging device performs processing for shooting with the shooting parameter of the second imaging device, in a case where the shooting parameter of the first imaging device is changed to the first shooting parameter by a user, and where the first relationship does not satisfy the predetermined condition.

13. A non-transitory computer readable medium that stores a program, wherein the program causes a computer to execute a control method for an electronic apparatus comprising a plurality of imaging devices including a first imaging device acquiring a first image, and a second imaging device acquiring a second image, the control method comprising:

acquiring a shooting parameter of at least one of the plurality of imaging devices;

controlling to change a shooting parameter of the second imaging device to a second shooting parameter based on a first shooting parameter, controlling so that the first imaging device performs processing for shooting with the first shooting parameter, and controlling so that the second imaging device performs processing for shooting with the second shooting parameter in a case where a shooting parameter of the first imaging device is changed to the first shooting parameter by a user, and where a first relationship satisfies a predetermined condition, the first relationship being either a positional relationship between the first imaging device and the second imaging device, or a relationship between the first image and the second image;

controlling not to change the shooting parameter of the second imaging device based on the first shooting parameter, controlling so that the first imaging device performs processing for shooting with the first shooting parameter, and controlling so that the second imaging device performs processing for shooting with the shooting parameter of the second imaging device, in a case where the shooting parameter of the first imaging device is changed to the first shooting parameter by a user, and where the first relationship does not satisfy the predetermined condition.

* * * * *